(12) United States Patent
Barner

(10) Patent No.: US 9,824,058 B2
(45) Date of Patent: Nov. 21, 2017

(54) BYPASS FIFO FOR MULTIPLE VIRTUAL CHANNELS

(71) Applicant: Cavium, Inc., San Jose, CA (US)

(72) Inventor: Steven C. Barner, Shrewsbury, MA (US)

(73) Assignee: Cavium, Inc., San Jose, CA (US)

( * ) Notice: Subject to any disclaimer, the term of this patent is extended or adjusted under 35 U.S.C. 154(b) by 455 days.

(21) Appl. No.: 14/541,917

(22) Filed: Nov. 14, 2014

(65) Prior Publication Data
US 2016/0139880 A1    May 19, 2016

(51) Int. Cl.
| | |
|---|---|
| *G06F 5/06* | (2006.01) |
| *G06F 13/42* | (2006.01) |
| *G06F 5/08* | (2006.01) |
| *G06F 13/40* | (2006.01) |
| *H04L 12/863* | (2013.01) |
| *H04L 12/861* | (2013.01) |
| *H04L 12/70* | (2013.01) |

(52) U.S. Cl.
CPC ............ *G06F 13/4282* (2013.01); *G06F 5/06* (2013.01); *G06F 5/065* (2013.01); *G06F 5/085* (2013.01); *G06F 13/4022* (2013.01); *H04L 47/50* (2013.01); *H04L 47/621* (2013.01); *H04L 47/6205* (2013.01); *H04L 49/90* (2013.01); *G06F 2205/065* (2013.01); *H04L 2012/5681* (2013.01)

(58) Field of Classification Search
None
See application file for complete search history.

(56) References Cited

U.S. PATENT DOCUMENTS

| | | | | |
|---|---|---|---|---|
| 5,224,093 A | * | 6/1993 | Denzel | G06F 5/16 365/189.02 |
| 5,544,122 A | * | 8/1996 | Mizukami | G11C 11/412 365/154 |
| 5,699,530 A | * | 12/1997 | Rust | G06F 5/16 365/189.02 |
| 5,745,709 A | * | 4/1998 | Okabayashi | G06F 15/17375 710/317 |
| 5,751,981 A | * | 5/1998 | Witt | G06F 9/30014 711/201 |
| 6,055,616 A | * | 4/2000 | Panwar | G06F 5/065 710/52 |
| 6,112,267 A | * | 8/2000 | McCormack | G06F 5/065 710/52 |
| 6,381,659 B2 | * | 4/2002 | Proch | G06F 3/0614 703/13 |
| 6,392,572 B1 | * | 5/2002 | Shiu | H03M 13/2771 341/81 |

(Continued)

*Primary Examiner* — Steven Snyder
(74) *Attorney, Agent, or Firm* — Hamilton, Brook, Smith & Reynolds, P.C.

(57) ABSTRACT

A group of low-level FIFOs may be logically bound together to form a super-FIFO. The super-FIFO may treat each low-level FIFO as a storage location. The super-FIFO may enable a push to (or a pop from) every low-level FIFO, simultaneously. The super-FIFO may enable a virtual channel (VC) to use the super-FIFO, bypassing a VC FIFO for the VC, removing several cycles of latency otherwise needed for enqueuing and dequeuing messages in the VC FIFO. In addition, the super-FIFO may enable bypassing of an arbiter, further reducing latency by avoiding a penalty of the arbiter.

41 Claims, 10 Drawing Sheets

(56) References Cited

U.S. PATENT DOCUMENTS

| | | | | |
|---|---|---|---|---|
| 6,681,274 B2* | 1/2004 | Ennis | G06F 13/4036 | 710/5 |
| 6,728,256 B1* | 4/2004 | Henrion | H04L 12/5601 | 370/412 |
| 6,728,790 B2* | 4/2004 | Ennis | G06F 13/4027 | 710/240 |
| 6,779,055 B2* | 8/2004 | Kim | G06F 5/065 | 710/52 |
| 6,820,151 B2* | 11/2004 | Ennis | H04L 47/6285 | 710/240 |
| 6,829,666 B1* | 12/2004 | Deneroff | G06F 15/17381 | 710/305 |
| 6,839,784 B1* | 1/2005 | Ennis | H04L 12/5693 | 710/112 |
| 7,089,380 B1* | 8/2006 | Schober | G06F 5/12 | 370/389 |
| 7,117,287 B2* | 10/2006 | Smith | G06F 5/10 | 710/306 |
| 7,551,645 B2* | 6/2009 | Gulati | H04L 49/3072 | 370/474 |
| 2001/0054121 A1* | 12/2001 | Proch | G06F 3/0614 | 710/57 |
| 2003/0093593 A1* | 5/2003 | Ennis | G06F 13/387 | 710/36 |
| 2003/0097499 A1* | 5/2003 | Ennis | H04L 12/5693 | 710/36 |
| 2003/0097500 A1* | 5/2003 | Ennis | G06F 13/4027 | 710/52 |
| 2003/0097514 A1* | 5/2003 | Ennis | G06F 13/128 | 710/306 |
| 2004/0151203 A1* | 8/2004 | Gulati | H04L 49/552 | 370/465 |
| 2004/0243743 A1* | 12/2004 | Smith | G06F 5/10 | 710/52 |
| 2007/0127480 A1* | 6/2007 | Chen | H04L 49/90 | 370/392 |
| 2007/0260782 A1* | 11/2007 | Shaikli | H04L 49/90 | 710/52 |
| 2014/0019650 A1* | 1/2014 | Li | G06F 5/06 | 710/53 |
| 2015/0186068 A1* | 7/2015 | Benisty | G06F 3/0673 | 711/154 |
| 2016/0124891 A1* | 5/2016 | Ahmad | G06F 13/4282 | 710/310 |

* cited by examiner

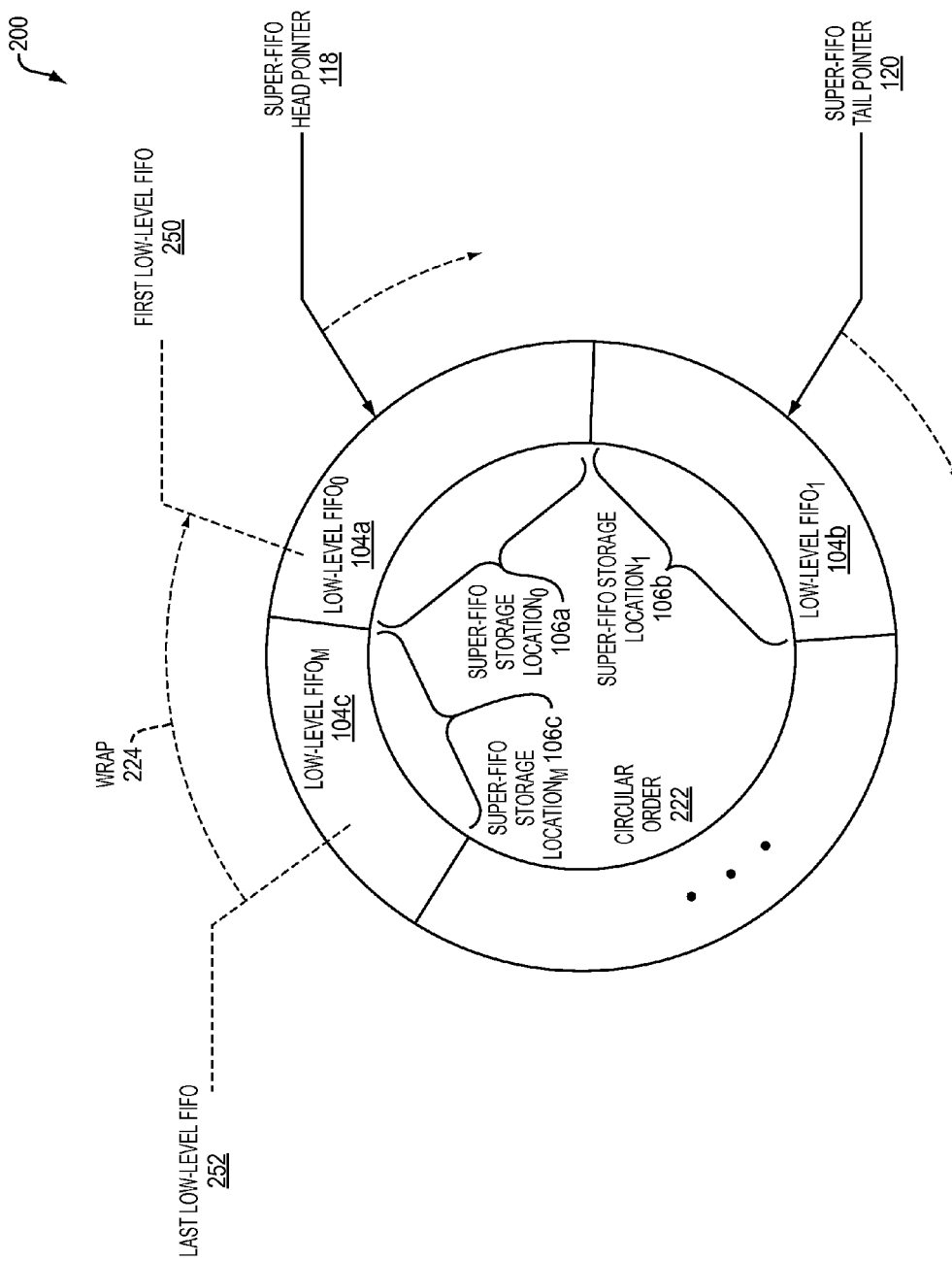

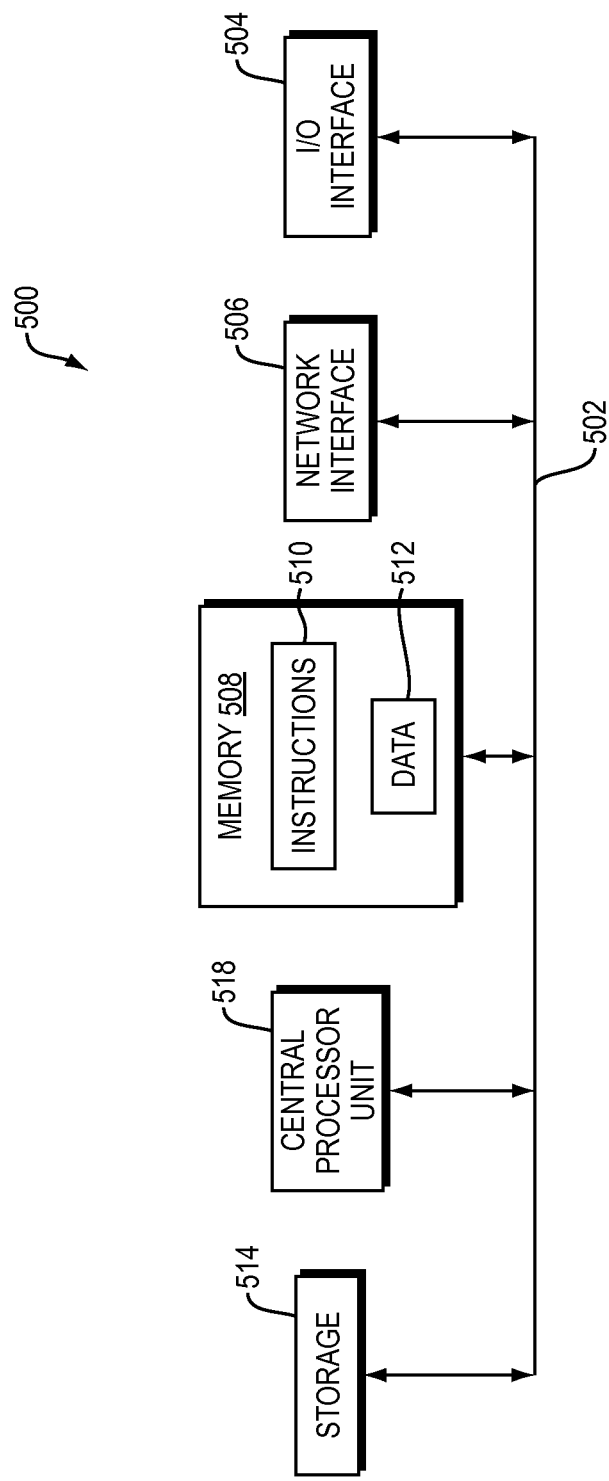

BYPASS FIFO FOR MULTIPLE VIRTUAL CHANNELS

BACKGROUND

A First-In First-Out (FIFO) is a storage device that may be used for synchronization purposes in computer or computer processing unit (CPU) hardware. A first entry stored (e.g., pushed) in the FIFO may be the first entry read (e.g., popped) from the FIFO. There are several different kinds of FIFOs, such as synchronous and asynchronous FIFOs. A synchronous FIFO may use the same clock for pushing and popping data. However, an asynchronous FIFO may use separate clocks for pushing and popping data.

SUMMARY

Embodiments disclosed herein provide an apparatus, method, computer program product, and corresponding system for reducing message transmission latency.

According to one embodiment, a circuit with a First-In/First-Out (FIFO) property may comprise a super-FIFO including a plurality of storage locations, the super-FIFO having a super-FIFO head pointer, a super-FIFO tail pointer, and a circular order. The circuit may further comprise a plurality of low-level FIFOs, each low-level FIFO may be employed as a super-FIFO storage location of the plurality of super-FIFO storage locations to form the super-FIFO. The super-FIFO may enable a push to each low-level FIFO, simultaneously, based on the super-FIFO tail pointer and the circular order, and the super-FIFO may enable a pop from each low-level FIFO, simultaneously, based on the super-FIFO tail pointer and the circular order, to effectuate the FIFO property of the circuit.

The super-FIFO may be coupled to a plurality of input bus slots and a number of the plurality of low-level FIFOs may equal a maximum number of data elements arriving, simultaneously, at the super-FIFO via the plurality of input bus slots.

The maximum number of data elements arriving, simultaneously, at the super-FIFO may be equal to a number of the plurality of input bus slots.

Each low-level FIFO may include a plurality of low-level FIFO storage locations and all of the low-level FIFO storage locations may be logically arranged in an M-by-N matrix of M rows and N columns. Each row of the M rows may include all low-level FIFO storage locations of a given low-level FIFO of the plurality of low-level FIFOs. Each column of the N columns may include a given low-level FIFO storage location of each low-level FIFO. The given low-level FIFO storage location may be located at a same location within each low-level FIFO. The M-by-N matrix may be filled or emptied on a column-by-column basis.

A first low-level FIFO of the plurality of low-level FIFOs may be first in the circular order, a last low-level FIFO of the plurality of low-level FIFOs may be last in the circular order, and the circular order may wrap from the last low-level FIFO back to the first low-level FIFO.

The super-FIFO tail pointer may indicate a next low-level FIFO that follows a last pushed low-level FIFO, consecutively, in the circular order, or the first low-level FIFO in an event none of the low-level FIFOs have been pushed.

The super-FIFO head pointer may indicate a next low-level FIFO that follows a last popped low-level FIFO, consecutively, in the circular order, or the first low-level FIFO in an event none of the low-level FIFOs have been popped.

The super-FIFO may be coupled to a plurality of input bus slots having an input slot order and data elements arriving via the input bus slots may have the input slot order of the input bus slots transferring the data elements to the super-FIFO.

Enabling the push to each low-level FIFO, simultaneously, according to the circular order, may include aligning the plurality of data elements having the input slot order with the plurality of low-level FIFOs, according to the circular order.

The circular order may be a circular order of the plurality of low-level FIFOs. The super-FIFO tail pointer may indicate a given low-level FIFO of the circular order. Aligning the plurality of data elements may include aligning the first data element of the input slot order to the given low-level FIFO of the circular order, and aligning, consecutively, the next data elements of the input slot order with the next low-level FIFOs of the circular order.

Enabling the pop from each low-level FIFO, simultaneously, according to the circular order, may include aligning the plurality of low-level FIFOs, according to the circular order, with a plurality of output bus slots having an output slot order.

The circular order may be a circular order of the plurality of low-level FIFOs, the super-FIFO head pointer may indicate a given low-level FIFO of the circular order. Aligning the plurality of low-level FIFOs may include aligning the given low-level FIFO with the first output bus slot of the output slot order, and aligning, consecutively, the next low-level FIFOs of the circular order with the next data output bus slots of the output slot order.

Each low-level FIFO of the plurality of low-level FIFOs may be associated with a low-level FIFO tail pointer indicating a storage location within a corresponding low-level FIFO for a next push operation to the corresponding low-level FIFO.

Each low-level FIFO of the plurality of low-level FIFOs may be associated with a low-level FIFO head pointer indicating a storage location within a corresponding low-level FIFO for a next pop operation of the corresponding low-level FIFO.

Enabling the push to each low-level FIFO, simultaneously, may include enabling pushing message segments from one or more message streams to the plurality of low-level FIFOs, simultaneously.

The plurality of low-level FIFOs may be class agnostic FIFOs employed to queue message segments irrespective of the associated message class type.

According to another embodiment, a system may comprise a bypass First-In First-Out (FIFO) stage. The bypass FIFO stage may include a super-FIFO including a plurality of storage locations and a plurality of low-level FIFOs, each low-level FIFO employed as a super-FIFO storage location of the plurality of super-FIFO storage locations to form the super-FIFO. The system may further comprise at least one other stage. The bypass FIFO stage may enable bypass of at least one element in the at least one other stage to reduce latency in the system.

The super-FIFO may be coupled to a plurality of input bus slots and a number of the plurality of low-level FIFOs may equal a maximum number of data elements arriving, simultaneously, at the super-FIFO via the plurality of input bus slots.

The maximum number of data elements arriving, simultaneously, at the super-FIFO may be equal to a number of the plurality of input bus slots.

The super-FIFO may be associated with a super-FIFO tail pointer, the super-FIFO tail pointer may indicate a given low-level FIFO of the plurality of low-level FIFOs as a starting push storage location and enabling a determination of a consecutive low-level FIFO push order for all other low-level FIFOs of the plurality of low-level FIFOs.

The bypass FIFO stage may be coupled to a plurality of ordered input bus slots each associated with a valid-and-eligible, valid-but-not-eligible, or invalid message segment type, on a cycle-by-cycle basis. A message segment associated with a given ordered input bus slot of the plurality of ordered input bus slots may be aligned with the given low-level FIFO indicated as the starting push storage location, in a given cycle, based on an association of the given ordered input bus slot with the valid-and-eligible message segment type, in the given cycle, and a highest input bus slot order relative to other ordered input bus slots of the plurality of ordered input bus slots associated with the valid-and-eligible message segment type.

An additional message segment may be aligned with a successive low-level FIFO, of the plurality of low-level FIFOs, according to the successive low-level FIFO push order determined, each additional message segment associated with a next ordered input bus slot that is associated with the valid-and eligible message segment type, and a next highest input bus slot order relative to the other ordered input bus slots associated with the valid-and-eligible message segment type.

The bypass FIFO stage may be coupled to a plurality of input bus slots and may be configured to align valid-and-eligible message segments, associated with respective input bus slots of the plurality of input slots, with respective low-level FIFOs of the plurality of low-level FIFOs, in a given cycle, enabling pushing of the valid-and-eligible message segments, simultaneously, to the respective low-level FIFOs.

The bypass FIFO stage may be coupled to a plurality of input bus slots and the super-FIFO may be associated with an super-FIFO tail pointer indicating a given low-level FIFO of the plurality of low-level FIFOs for pushing a data element transferred via a given input bus slot of the plurality of input bus slots.

The at least one other stage may include a virtual channel (VC) FIFO stage including a plurality of VC FIFOs, each VC FIFO of the plurality of VCs FIFOs associated with a given VC and employed to queue message segments of messages associated with a message class type of the given VC and the at least one element is at least one VC FIFO of the plurality of VC FIFOs.

The VC FIFO stage may precede the bypass FIFO stage and the at least one other stage may further include an arbitration stage including an arbiter and interposed between the VC FIFO stage and the bypass FIFO stage in the system. The at least one element may include the arbiter.

The arbitration stage may be prevented from sending traffic associated with the given VC in an event the super-FIFO has traffic queued for the given VC.

The system may further comprise an output selection stage to select between the arbitration stage and the bypass FIFO stage for sending data in a given cycle. Selecting between the arbitration stage and the bypass FIFO stage may be based on a round robin decision in an event both stages have data for sending in the given cycle. In an event both stages have data for sending in the given cycle, the output selection stage may give priority to the arbitration stage unless the arbitration stage selects traffic for a particular VC for which the super-FIFO has queued traffic, in which case the output select stage may give priority to the bypass FIFO stage, enabling the super-FIFO to drain.

The given VC may be eligible to use the bypass FIFO stage in a given cycle provided a plurality of conditions are satisfied to prevent traffic reordering within the given VC and to prevent traffic blocking among different VCs.

The least one other stage may further include an arbitration stage and the plurality of conditions may include: a given VC FIFO, of the plurality of VC FIFOs, associated with the given VC is empty, the given VC FIFO is not being pushed in the given cycle, the arbitration stage is not holding a message segment popped from the given VC FIFO, the given VC FIFO has at least one credit for sending, a bypass control associated with the given VC is not disabled, and the super-FIFO is not full.

The system may further comprise a bypass control stage for the bypass FIFO stage, the bypass control stage may be employed to enable bypass of the bypass FIFO stage.

The system may be a multi-stream message system and entries queued in the bypass FIFO stage may be message segments from one or more message streams.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2A is a block diagram of an embodiment of a circular order of a super-FIFO.

FIG. 5 is a block diagram of an example internal structure of a computer optionally within an embodiment disclosed herein.

DETAILED DESCRIPTION

Figure 1A:
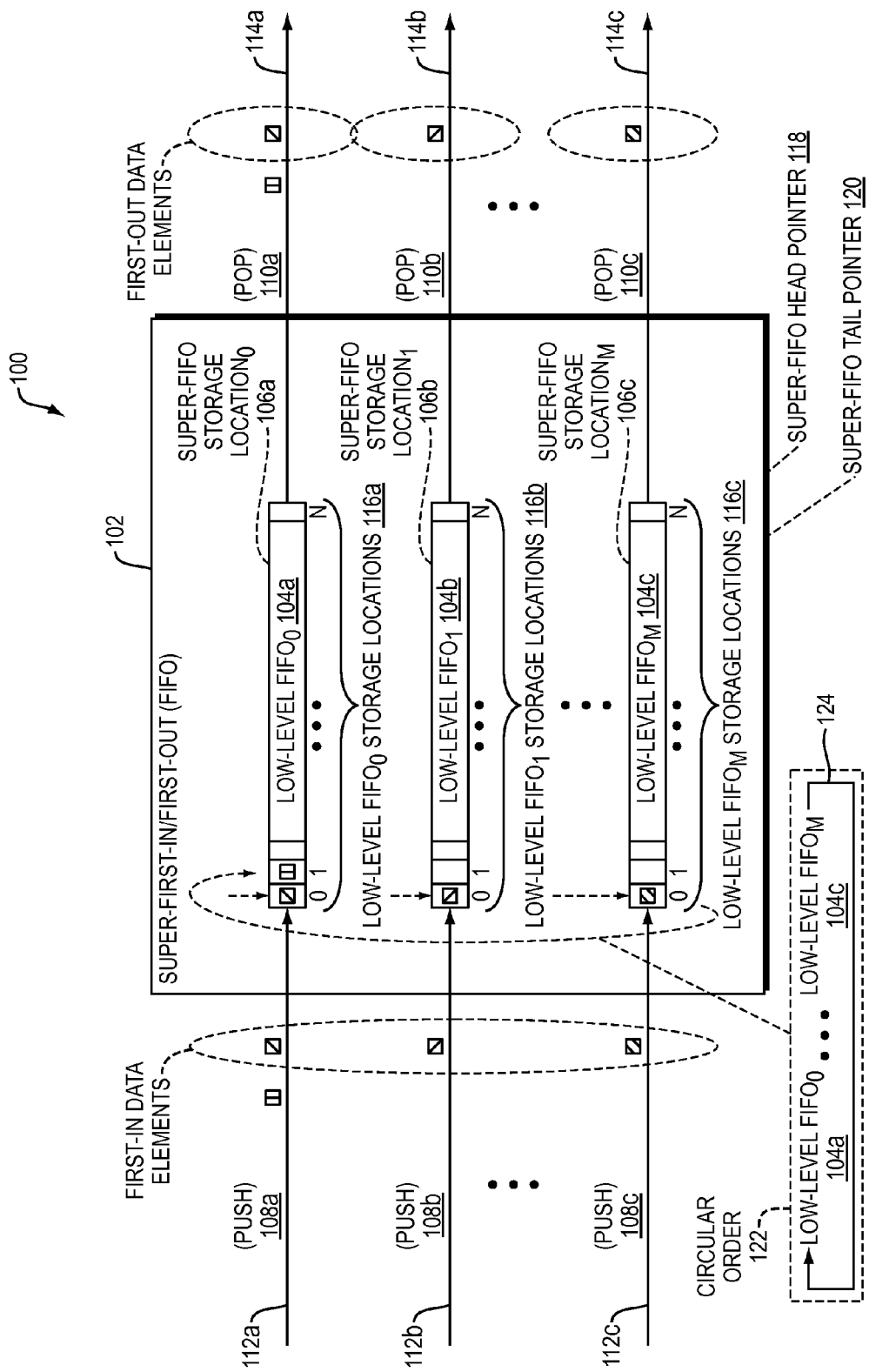
FIG. 1A a block diagram an embodiment of a circuit with a First-In/First-Out (FIFO) property.

A description of example embodiments of the invention follows.

A system for communicating messages from a sender to a receiver may assign each message a classification based on a property of the message. For example, a sender may assign a classification such as a request, response, or forward classification to the message being sent. In such a system, messages of the same classification may be strictly ordered while messages of a different classification must not block each other. A message may be comprised of one or more words of data, or segments of data. Each word of data may be any suitable number of bits. A stream of messages all for the same class can be referred to interchangeably herein as traffic.

The system may use a single physical channel to transfer all messages by employing virtual channels (VCs) (i.e., conduits). Each virtual channel (VC) may be assigned a class of messages and the system may maintain a corresponding VC First-In/First-Out (FIFO) for transmission of each class of message. Upon scheduling a given message for transmission, the given message may be placed in a VC FIFO that corresponds to the class of the message. Whenever a given VC FIFO reaches a full state, the scheduler may refrain from scheduling messages for the corresponding virtual channel. The system may include an arbiter that may select messages for transmission from among the VC FIFOs. The selection may be based on priority associated with the message classes.

A counter may be maintained for each VC to enable the arbiter to avoid any class of message for which the receiver is not prepared to receive. The counter may be debited on the transmission of a message from the VC and credited in response to an indication from the receiver. The sender and the receiver may be configured to agree on a starting value of each VC counter. The arbiter may be configured to refrain from selecting messages from any VCs that have a corresponding counter value of zero to avoid having those messages block transmission of other VCs that have credits for sending, for example, other VCs that have corresponding counter values that are non-zero.

Since VC FIFOs may be sized for performance, they are typically large enough to require the use of a Static Random Access Memory (SRAM). Consequently, enqueuing a message in a VC FIFO and later dequeuing the message requires several additional cycles of latency. In addition, arbitrating among the multiple VCs is likely to add several more cycles of latency. For latency sensitive messages, a combined additional latency of the SRAM and the arbitration is a significant burden. Using a small bypass FIFO for each VC may avoid the SRAM penalty, but not the arbitration penalty. In addition, such a solution scales badly as a number of the VCs increases.

According to embodiments disclosed herein, latency in a multi-stream message system may be reduced by employing a "FIFO of FIFOs" type data structure. The "FIFO of FIFOs" type data structure may be referred to interchangeably herein as a super-FIFO (e.g., an aggregate FIFO, global FIFO, or high-level FIFO). A plurality of FIFOs, each of which may be referred to interchangeably herein as a low-level FIFO (e.g., an individual FIFO, local FIFO, or sub-FIFO), may be used to form the super-FIFO. The super-FIFO may be employed as a bypass FIFO and may be advantageously located in a transmission path such that it precedes an arbiter to avoid the arbitration penalty and enables VC FIFOs to be bypassed as well.

FIG. 1A is a block diagram of an embodiment of a circuit 100 with a First-In/First-Out (FIFO) property. The circuit 100 may comprise a super-FIFO 102 including a plurality of storage locations 106a-c. The super-FIFO 102 may have a super-FIFO head pointer 118, a super-FIFO tail pointer 120, and a circular order 122. The circuit may further comprise a plurality of low-level FIFOs 104a-c, each low-level FIFO of the plurality of low-level FIFOs 104a-c may be employed as a super-FIFO storage location of the plurality of super-FIFO storage locations 106a-c to form the super-FIFO 102. The super-FIFO 102 may enable a push 108a-c to each low-level FIFO 104a, 104b, and 104c, simultaneously, according to the circular order 122, and the super-FIFO 102 may enable a pop 110a-c from each low-level FIFO 104a, 104b, and 104c, simultaneously, according to the circular order, to effectuate the FIFO property of the circuit.

As such, the plurality of low-level FIFOs 104a-c may be considered logically grouped and bound together to form the super-FIFO 102, with the super-FIFO 102 treating each of the low-level FIFOs 104a-c as a storage location of the super-FIFO that represents a single storage location entity from the perspective of the super-FIFO. For example, while each low-level FIFO may have a plurality of low-level FIFO storage locations, such as the plurality of low-level FIFO storage locations 116a, 116b or 116c, each low-level FIFO itself may represent a single storage location of the super-FIFO. As such, a circular order 122 of the super-FIFO 102 may include the low-level FIFOs 104a, 104b, and 104c, ordered in a circular order. It should be understood that a number of low-level FIFOs shown are for illustrative purposes and any suitable number of low-level FIFOs may be employed to form the super-FIFO 102.

Figure 1B:
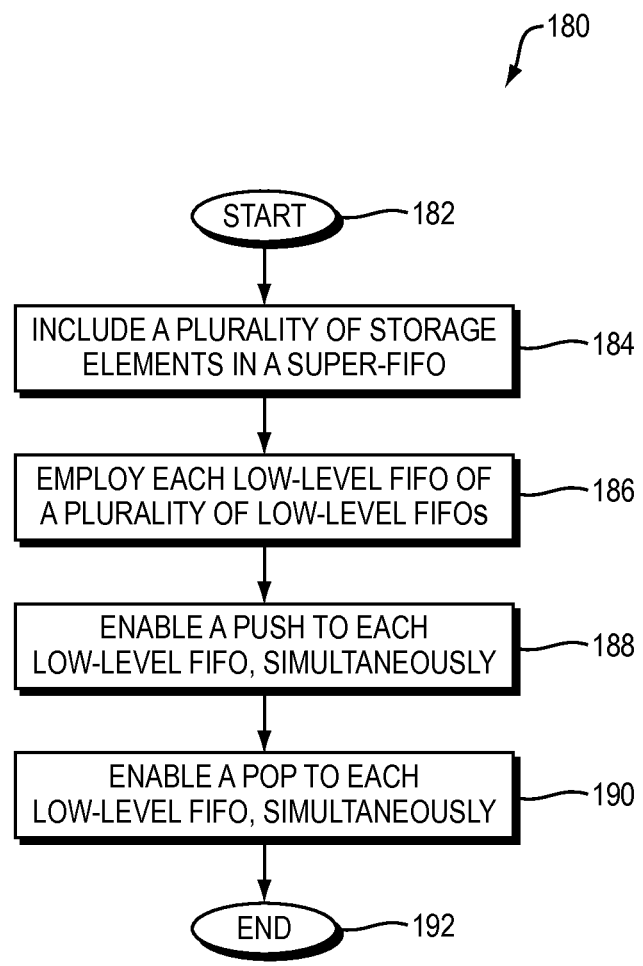
FIG. 1B is flow diagram 180 of an embodiment of a method.

FIG. 1B is flow diagram 180 of an embodiment of a method. The method may start (182) and include a plurality of storage locations in a super-FIFO, the super-FIFO having a super-FIFO head pointer, a super-FIFO tail pointer, and a circular order (184). The method may include employing each low-level FIFO of a plurality of low-level FIFOs as a super-FIFO storage location of the plurality of super-FIFO storage locations to form the super-FIFO (186). The method may include enabling a push to each low-level FIFO, simultaneously, based on the super-FIFO tail pointer and the circular order (188) and enabling a pop from each low-level FIFO, simultaneously, based on the super-FIFO tail pointer and the circular order (190), to effectuate the FIFO property of the circuit. The method thereafter ends (192) in the example embodiment.

FIG. 2A is a block diagram 200 of an embodiment of the circular order 222 of the super-FIFO 102. A first low-level FIFO 250, such as low-level FIFO 104a, of the plurality of low-level FIFOs 104a-c, may be first in the circular order 222. A last low-level FIFO 252, such as low-level FIFO 104c, of the plurality of low-level FIFOs 104a-c, may be last in the circular order 222. The circular order may wrap 224 from the last low-level FIFO 252 back to the first low-level FIFO 250.

The super-FIFO head pointer 118 and the super-FIFO tail pointer 120 may each indicate a respective super-FIFO storage location for a next pop or push operation, respectively. For example, in the example embodiment of FIG. 2A, the super-FIFO head pointer 118 points to the low-level FIFO 104a. As such, a next pop operation may include popping a pushed data element, such as a message segment, from the low-level FIFO 104a and subsequently updating the super-FIFO head pointer 118 to the next low-level FIFO in the circular order, resulting in the super-FIFO head pointer 118 pointing to the low-level FIFO 104b, in the example embodiment. Further, in the example embodiment of FIG. 2A, the super-FIFO tail pointer 120 points to the low-level FIFO 104b. As such, a next push operation may include pushing a data element, such as a message segment, to the low-level FIFO 104b and subsequently updating the super-FIFO tail pointer 120 to point to the next low-level FIFO in the circular order, resulting in the super-FIFO tail pointer 120 pointing to a next consecutively ordered low-level FIFO (not shown) in the circular order 222. The super-FIFO and the low-level FIFOs may be asynchronous FIFOs that use separate clocks for pushing and popping data.

Turning back to FIG. 1A, the super-FIFO 102 may be coupled to a plurality of input bus slots 112*a-c*. The plurality of input bus slots 112*a-c* may be used to transfer data elements, such as message segments of messages that may be message words that are 64 bits in length or of any other suitable length. As such, a bus (not shown) may be wide enough to transfer multiple message words, or any other suitable data elements, simultaneously, via the inputs bus slots 112*a-c* to the super-FIFO 102.

According to embodiments disclosed herein, NUM_BUS_SLOTS may be defined as a total number of bus slots or positions that may be used to simultaneously transfer message words. Similarly, NUM_INPUT_BUS_SLOTS may be defined as a total number of input bus slots or positions that may be used to simultaneously transfer message words to the super-FIFO 102 and NUM_OUTPUT_BUS_SLOTS may be defined as a total number of output bus slots or positions that may be used to simultaneously transfer message words from the super-FIFO 102. It should be understood that the message words transferred, simultaneously, need not be for the same message class. The total number of input bus slots may be six, or any other suitable number, and the total number of output bus slots may be two, or any other suitable number.

According to embodiments disclosed herein, the input bus slots may have an input slot order. Data elements arriving via the input bus slots may inherit the input slot order of a corresponding input bus transferring a respective data element. The input slot order may be designated such as by numbering the input bus slots, for example, from zero to NUM_INPUT_BUS_SLOTS−1, wherein zero may denote a highest input slot order or a first input slot order and NUM_INPUT_BUS_SLOTS−1 may denote a lowest input slot order or a last input slot order. Similarly the output bus slots may have an output slot order. The output slot order may be designated such as by numbering the output bus slots, for example, from zero to NUM_OUTPUT_BUS_SLOTS−1, wherein zero may denote a highest output bus slot order or a first output bus slot order and NUM_OUTPUT_BUS_SLOTS−1 may denote a lowest output bus slot order or a last output bus slot order. It should be understood that the input bus slots and output bus slots may be ordered in any suitable manner.

According to embodiments disclosed herein, on any given cycle, a number of valid message words, also referred to interchangeably herein as NUM_VAL_WORD, may be zero to NUM_INPUT_BUS_SLOTS−1. It should be understood that multiple input bus slots that transfer, simultaneously, a valid message word on any given cycle need not be consecutively ordered input bus slots. A bus slot, such as an input bus slot or an output bus slot, that does not carry a valid message word on a given cycle may be referred to herein as a hole.

According to embodiments disclosed herein, a number of the plurality of low-level FIFOs 104*a-c* may be equal to a maximum number of data elements arriving, simultaneously, at the super-FIFO 102 via the plurality of input bus slots 112*a-c*. As such, the maximum number of data elements may be captured (i.e., stored), simultaneously, by pushing the maximum number of data elements to the super-FIFO 102, in parallel. The maximum number of data elements arriving, simultaneously, at the super-FIFO 102 may be equal to a number of the plurality of input bus slots. As such, according to embodiments disclosed herein, a total number of the low-level FIFOs 104*a-c* of the super-FIFO 102 may be equal to a maximum number of simultaneously arriving message words that may be the NUM_INPUT_BUS_SLOTS.

It should be understood that the super-FIFO 102 may be coupled to any suitable number of input bus slots. For example, the super-FIFO 102 may be coupled to six input bus slots. As such, the maximum number of data elements arriving, simultaneously, at the super-FIFO 102 may be six, resulting in a number of the plurality of low-level FIFOs to also be six, according to the example embodiment.

Each low-level FIFO may maintain state of the corresponding low-level FIFO, such as a low-level FIFO tail pointer and a low-level FIFO head pointer. The state maintained may further include status that may reflect a full or an empty status, or any other suitable status that may be associated with a FIFO. The low-level FIFO tail pointer of a low-level FIFO may indicate a low-level FIFO storage location that may be used by a next push operation to the low-level FIFO. The low-level FIFO head pointer may indicate the low-level FIFO storage location to be used for a next pop operation of the low-level FIFO. A storage structure for each low-level FIFO may be a non-volatile memory element, such as flop array or an SRAM, or any other suitable storage structure for a FIFO.

Figure 2B:
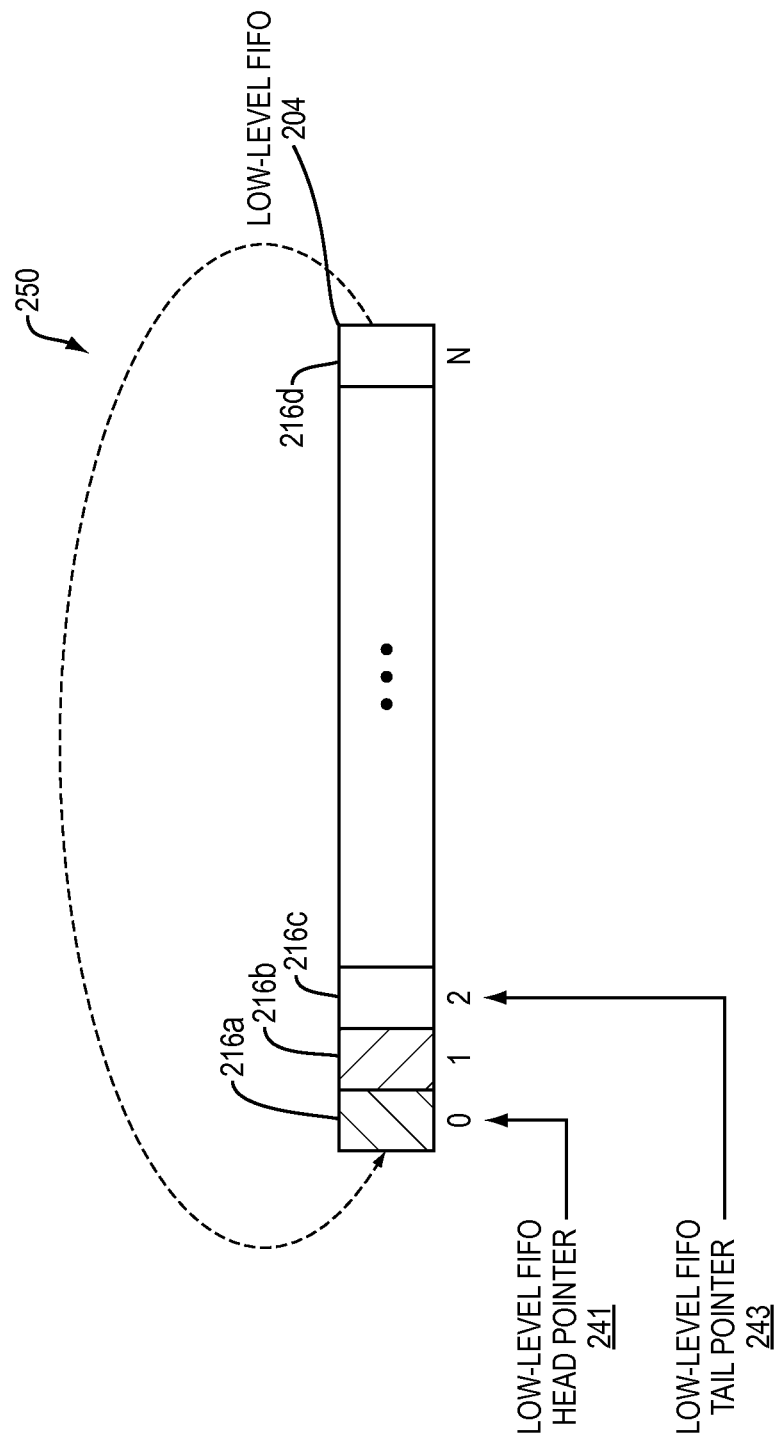
FIG. 2B is a block diagram of an embodiment of a low-level FIFO.

FIG. 2B is a block diagram 250 of an embodiment of a low-level FIFO 204. The low-level FIFO may have a low-level FIFO head pointer 241 and a low-level FIFO tail pointer 243. The low-level FIFO may have a plurality of low-level FIFO storage locations 216*a-d*. As such, a data element may be pushed to the super-FIFO, such as the super-FIFO 102 of FIG. 1A, pushing the data element to a given super-FIFO storage location that is pointed to by the super-FIFO tail pointer 243, such as the low-level FIFO 204. The low-level FIFO 204 may in turn push the data element to a given low-level FIFO storage location that is pointed to by the low-level FIFO tail pointer 243.

Similarly, a pop of the super-FIFO may pop a data element from a given super-FIFO storage location pointed to by the super-FIFO head pointer, such as the low-level FIFO 204. The low-level FIFO 204 may in turn pop the data element from a given low-level FIFO storage location that is pointed to by the low-level FIFO head pointer 241.

According to embodiments disclosed herein, a push operation to the super-FIFO may include multiple data elements for queuing in a given cycle. As such, the push operation to the super-FIFO may include multiple simultaneous low-level FIFO push operations, wherein each push operation of the multiple simultaneous push operations is to a different low-level FIFO that are determined based on the super-FIFO head pointer and the circular order. Similarly, a pop operation of the super-FIFO may cause multiple simultaneous pop operations, wherein each pop operation of the multiple simultaneous pop operations is a pop of a different low-level FIFO in the circular order.

As disclosed above, a group of low-level FIFOs 104*a-c* may be logically bound together to form the super-FIFO 102. The super-FIFO 102 may treat each low-level FIFO as a storage location of the super-FIFO 102. The super-FIFO 102 may provide the ability to push to (or pop from) every low-level FIFO, simultaneously. The super-FIFO 102 may maintain a super-FIFO tail pointer 120 and a super-FIFO head pointer 118. The super-FIFO tail pointer 120 may indicate the next push storage location and may also be employed to determine the next NUM_INPUT_BUS_SLOT push storage locations. Similarly, the super-FIFO head pointer 118 may indicate the next pop storage location and may also be employed to determine the next NUM_OUTPUT_BUS_SLOT pop storage locations.

According to embodiments disclosed herein, during a super-FIFO 102 push operation, the message slots may be first collapsed to remove holes occupied by invalid message words, or message words that are valid but not eligible, resulting in a total number of push operations (i.e., NUM_PUSH_WORD). Collapsing may include masking. The resulting valid message words (i.e., PUSH_WORD[0] . . . PUSH_WORD[NUM_PUSH_WORD−1]) for a super-FIFO push operation may then be rotated (e.g., re-oriented) based on a modulo operation using the super-FIFO tail pointer 102 (i.e., SUPER_FIFO_TAIL_PTR) such that the message words are aligned with the low-level FIFOs as follows:

PUSH_WORD[0]=>SUPER_FIFO_TAIL_PTR
PUSH_WORD[1]=>(SUPER_FIFO_TAIL_PTR+1) % NUM_INPUT_BUS_SLOTS
. . .
PUSH_WORD[NUM_PUSH−1]=>(SUPER_FIFO_TAIL_PTR+NUM_PUSH_WORD−1) % NUM_BUS_SLOTS.

During a super-FIFO 102 pop operation, a total number of words to be popped (i.e., NUM_POP_WORDS) may be retrieved starting at the low-level FIFO indicated by the super-FIFO head pointer 118 (i.e., SUPER_FIFO_HEAD_PTR) of the super-FIFO 102. The collective output of the low-level FIFOs may be rotated using the super-FIFO head pointer 118 of the super-FIFO 102, wherein the valid words (i.e., POP_WORD[0] POP_WORD[NUM_POP_WORDS−1]) are popped from the corresponding NUM_POP low-level FIFOs as follows:

SUPER_FIFO_HEAD_PTR=>POP_WORD[0]
(SUPER_FIFO_HEAD_PTR+1) % NUM_OUTPUT_BUS_SLOTS=>POP_WORD[1]
(SUPER_FIFO_TAIL_PTR+NUM_POP_WORDS−1) % NUM_INPUT_BUS_SLOTS=>POP_WORD[NUM_POP_WORDS−1].

During all super-FIFO operations, the super-FIFO head/tail pointers as well as the number of entries stored in the super-FIFO (i.e., SUPER_FIFO_NUM_ENTRIES) may be updated as follows:

SUPER_FIFO_HEAD_PTR<=(SUPER_FIFO_HEAD_PTR+POP_WORDS) % NUM_INPUT_BUS_SLOTS
and
SUPER_FIFO_TAIL_PTR<=(SUPER_FIFO_TAIL_PTR+PUSH WORDS) % NUM_INPUT_BUS_SLOTS
SUPER_FIFO_NUM_ENTRIES<=SUPER_FIFO_NUM_ENTRIES+NUM_PUSH WORDS−NUM_POP_WORDS.

According to one embodiment, the alignment may be implemented via a rotating multiplexer or switch, or via any other suitable logic.

Figure 3A:
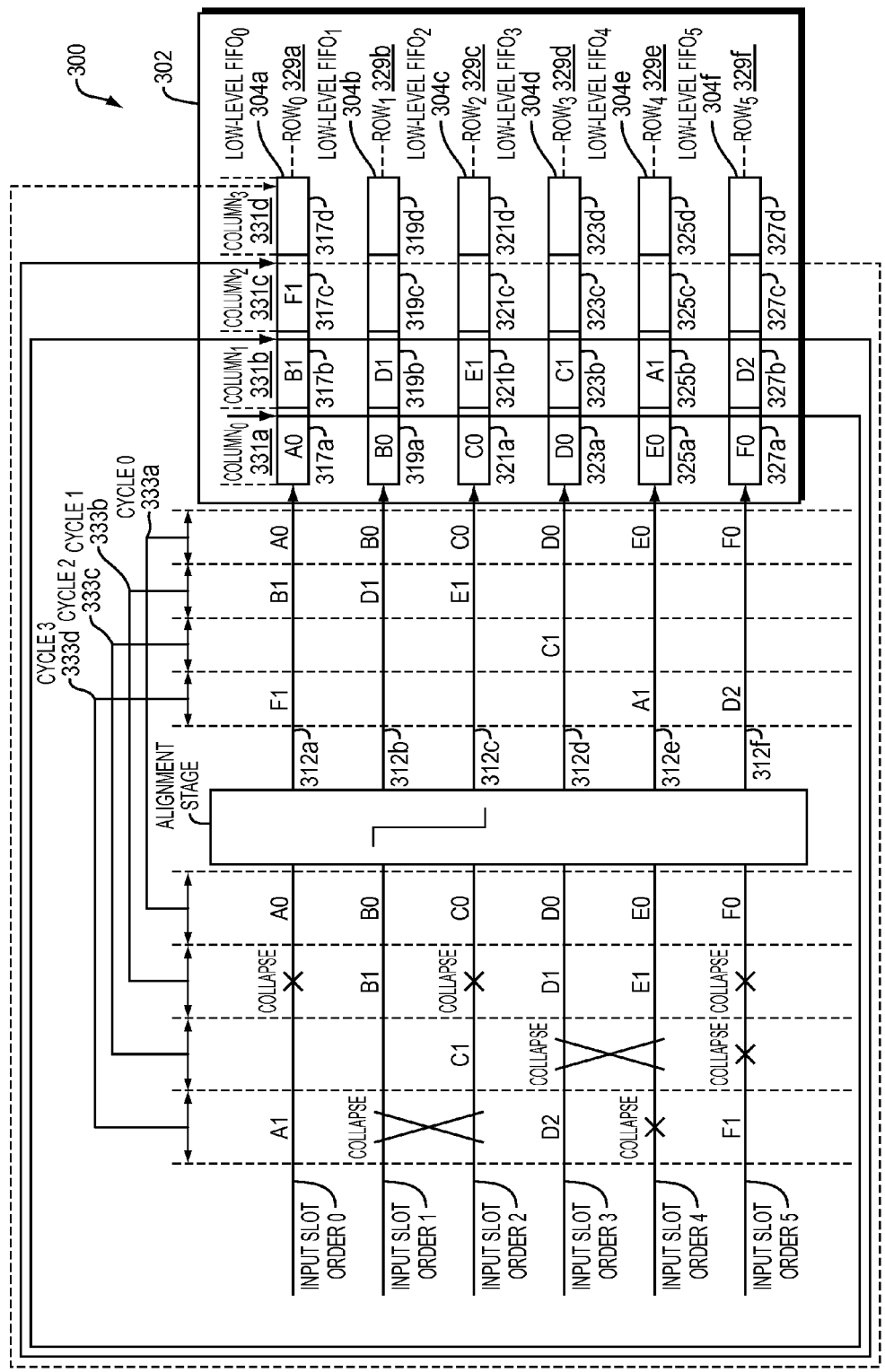
FIG. 3A is a block diagram of an embodiment of a super-FIFO that is formed from six low-level FIFOs and cycles of pushing data elements thereto.

FIG. 3A is a block diagram 300 of an embodiment of a super-FIFO 302 that is formed from six low-level FIFOs 304*a-f* and cycles 333*a-d* of pushing data elements thereto. Each of the low-level FIFOs 304*a-e* includes four low-level FIFO storage locations, 317*a-d*, 319*a-d*, 321*a-d*, 323*a-d*, 325*a-d*, 327*a-d*, respectively. According to the example embodiment, all of the low-level FIFO storage locations (i.e., 317*a-d*, 319*a-d*, 321*a-d*, 323*a-d*, 325*a-d*, and 327*a-d*) may be logically arranged in an M-by-N matrix of M rows 329*a-e* and N columns 331*a-e*.

Each row of the M rows 329*a-e* may include all low-level of the FIFO storage locations of a given low-level FIFO of the plurality of low-level FIFOs. For example, the M rows 329*a-e* may include the low-level FIFO storage locations, 317*a-d*, 319*a-d*, 321*a-d*, 323*a-d*, 325*a-d*, 327*a-d*, respectively. Each column of the N columns 331*a-e* may include a given low-level FIFO storage location of each low-level FIFO, the given low-level FIFO storage location may be located at a same location within each low-level FIFO. For example, the column 331*a* may include the low-level FIFO storage locations 317*a*, 319*a*, 321*a*, 323*a*, 325*a*, and 327*a*, the column 331*b* may include the low-level FIFO storage locations 317*b*, 319*b*, 321*b*, 323*b*, 325*b*, and 327*b*, and so forth. The M-by-N matrix may be filled or emptied on a column-by-column basis.

For example, according to embodiments disclosed herein, the low-level FIFOs 304*a-f* may be pushed or popped according to the circular order of the super-FIFO 302. The circular order of the super-FIFO 302 may designate low-level FIFO 304*a* as the first low-level FIFO and the low-level FIFO 304*f* as the last low-level FIFO. The maximum number of data elements that may arrive at the super-FIFO 302 is six in the example embodiment, as the super-FIFO 302 is coupled to six input bus slots 312*a-f*. As a data element is pushed or popped to a low-level FIFO, it should be understood that a corresponding low-level FIFO tail pointer or a corresponding low-level FIFO head pointer may be used to determine the low-level FIFO storage location for the push or pop operation and may be updated as a result thereof.

In the example embodiment, on a first cycle, the cycle 333*a*, the super-FIFO head and tail pointers may both be pointing to the first low-level FIFO of the super-FIFO circular order, which may be the low-level FIFO 304*a* in the example embodiment. Six data elements may arrive on the cycle 333*a*, A0, B0, C0, D0, E0, and F0, via the input bus slots 312*a-f*, respectively, and may be pushed, simultaneously, filling the column 331*a*. As a result, the super-FIFO tail pointer may be updated six times, thus, wrapping back, and pointing to the low-level FIFO 304*a* as a result.

On a next cycle, the cycle 333*b*, three data elements may arrive, B1, D1, and E1. According to embodiments disclosed herein, the three data elements B1, D1, and E1 may be aligned with the low-level FIFOs 304*a*, 304*b*, and 304*c* based on the input slot order of the associated input slots transferring the three data elements and the super-FIFO tail pointer. As the input bus slots 312*a*, 312*c*, and 312*f* are not transferring valid data elements on the cycle 333*b*, those input bus slots may be considered holes and collapsed, thus, enabling the three data elements B1, D1, and E1 to be aligned. The three data elements B1, D1, and E1 may be aligned, consecutively, starting with a given low-level FIFO pointed to by the super-FIFO tail pointer, that may be the low-level FIFO 304*a*. As such, the three data elements may be aligned, consecutively, with the low-level FIFOs 304*a*, 304*b*, and 304*c* and pushed. As a result of the push operations, the super-FIFO tail pointer may be updated to point to the low-level FIFO 304*d*.

Figure 3B:
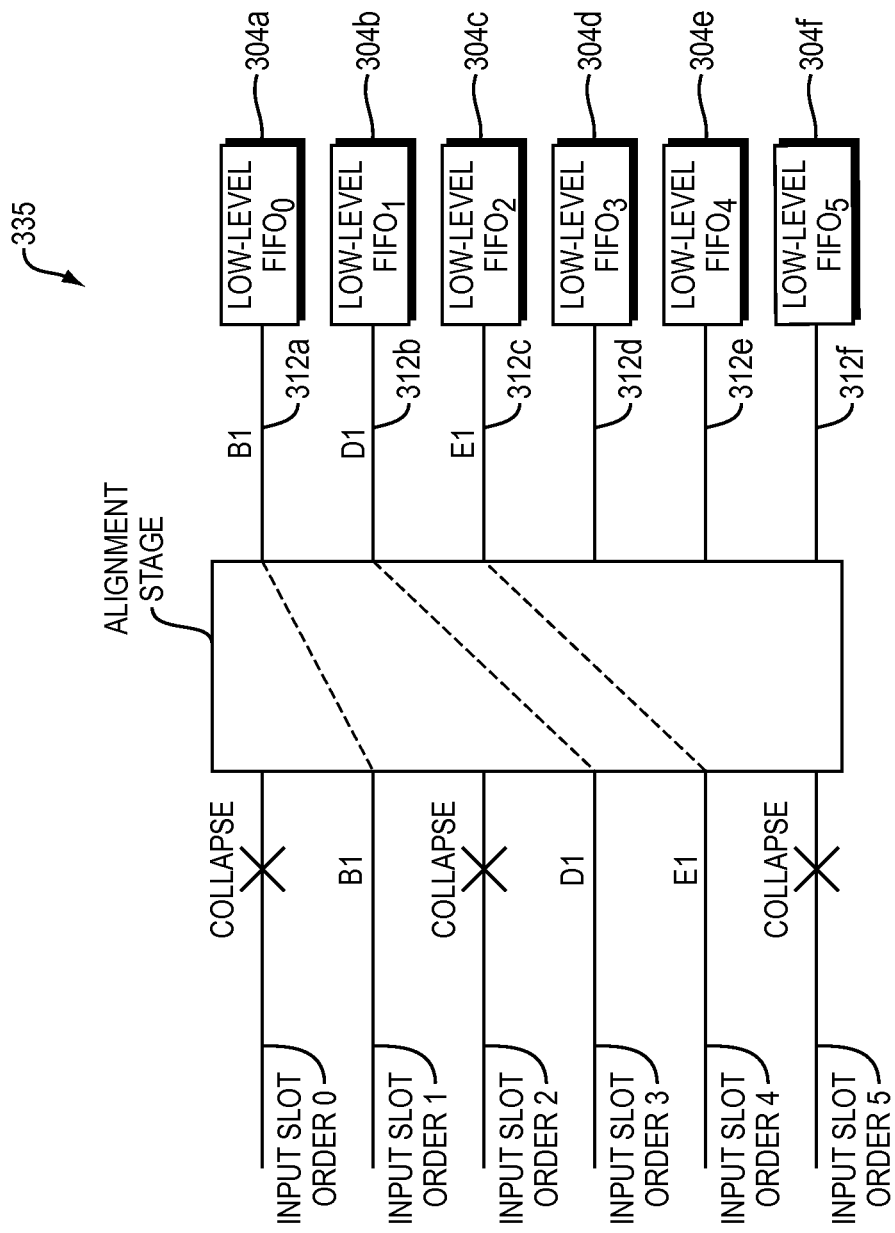
FIG. 3B is a block diagram of an embodiment illustrating aligning data elements with the low-level FIFOs on a cycle of FIG. 3A.

FIG. 3B is a block diagram 335 of an embodiment illustrating aligning the data elements B1, D1, and E1, with the low-level FIFOs on the cycle 333*b* of FIG. 3A.

On a next cycle, the cycle 333*c*, one data element may arrive, C1. According to embodiments disclosed herein, the data element C1 may be aligned with the low-level FIFO 304*d* that is pointed to by the super-FIFO tail pointer at the beginning of the cycle 333*c* as C1 is the only valid data for the cycle 333*c*. The super-FIFO tail pointer may be updated to point to the low-level FIFO 304*e*.

On a next cycle, the cycle 333*d*, three data elements may arrive, A1, D2, and F1. According to embodiments disclosed herein, the three data elements A1, D2, and F1 may be aligned with the low-level FIFOs 304*e*, 304*f*, and 304*a*, respectively, based on the input bus order of the associated input slots transferring the three data elements and the super-FIFO tail pointer. As the input bus slots 312b, 312c, and 312e are not transferring valid data elements on the cycle 333d, those input bus slots may be considered holes and collapsed enabling the three data elements A1, D2, and F1 to be aligned, consecutively, starting with a given low-level FIFO pointed to by the super-FIFO tail pointer, that may be the low-level FIFO 304e at the beginning of the cycle 333d, and pushed, filling the column 331b, and proceeding to fill a first row location of the next column, low-level FIFO storage location 317c, with the data element F1.

Figure 3C:
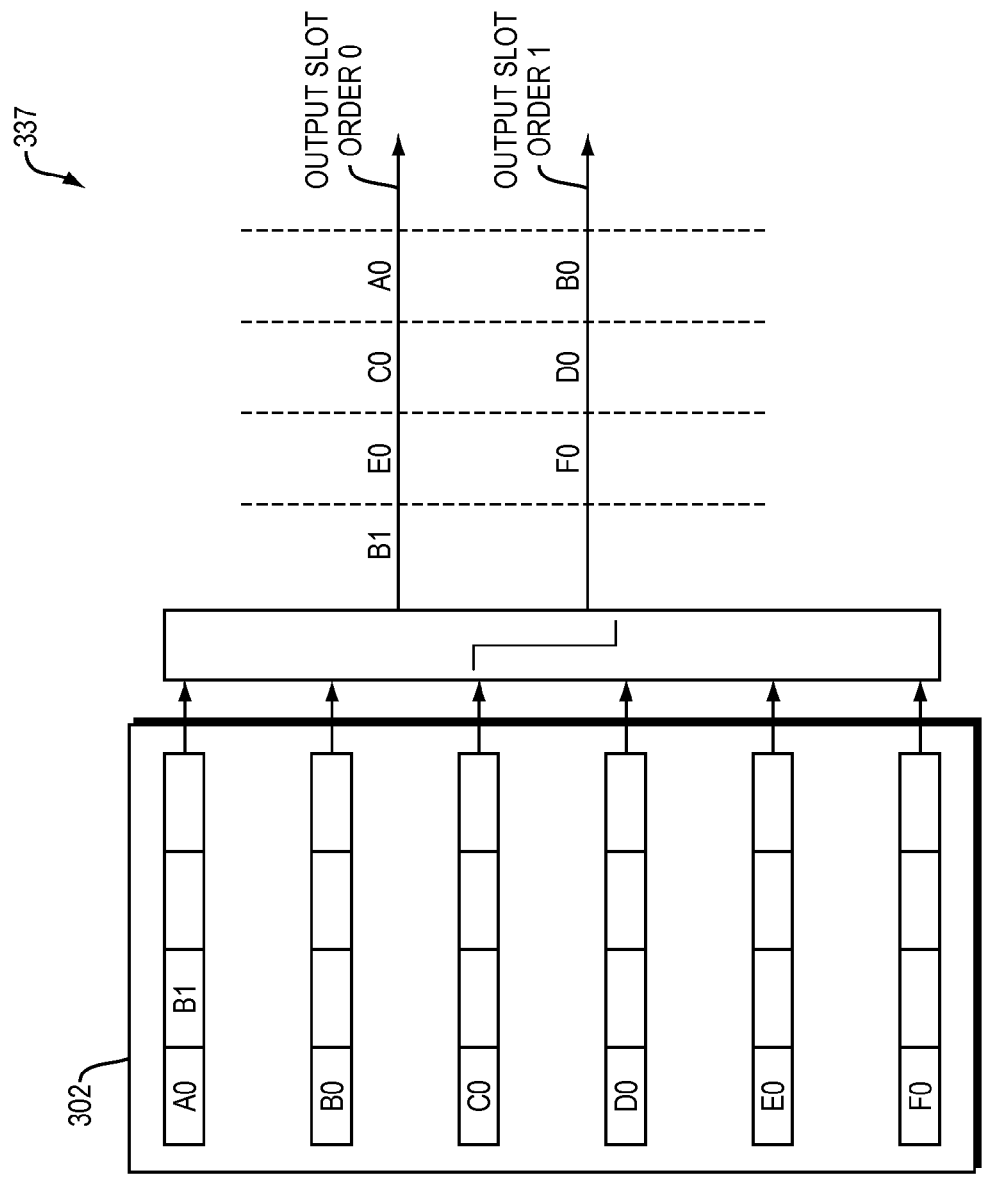
FIG. 3C is a block diagram of an embodiment of popping the super-FIFO 302 from FIG. 3A on a column-by-column basis.

FIG. 3C is a block diagram 337 of an embodiment of popping the super-FIFO 302 from FIG. 3A on a column-by-column basis. In the example embodiment of FIG. 3C, a number of output bus slots may be two.

In addition to providing the ability to push (or pop) multiple words, simultaneously, it should be understood that another advantage of the super-FIFO is that it can be built from off-the-shelf FIFO controllers.

Further, according to embodiments disclosed herein, the super-FIFO 102 may be employed as a bypass stage to bypass one or more VC FIFOs in a VC FIFO stage and an arbiter in an arbitration stage.

Employing the super-FIFO 102 to bypass a given VC FIFO in a VC FIFO stage may depend on satisfying multiple conditions. Ensure that the conditions are satisfied may prevent traffic reordering within a VC and may prevent traffic blocking among different VCs.

According to embodiments disclosed herein, a given VC, VC 'N', may be eligible to use the super-FIFO bypass stage only while all of the following conditions are satisfied:
  the VC[N] FIFO is empty
  the VC[N] FIFO is not being pushed
  the arbiter is not holding VC[N] data
  the VC[N] has credits to send
  the VC[N] bypass is not disabled via a bypass control stage
  the super-FIFO has room The super-FIFO bypass stage may contain some VC[N] traffic when the VC becomes ineligible to use the super-FIFO bypass stage. In such a case, the incoming VC[N] traffic may be pushed into the VC FIFO instead of the super-FIFO. The arbiter may be configured to refrain from send VC[N] traffic while the super-FIFO bypass stage contains VC[N] traffic.

At any given time, both the arbiter and the super-FIFO may have a selection of data to send. Selecting between the arbiter's data selection and the super-FIFO's data selection may be based on a round-robin based selection. Alternately, the arbiter may have priority until the arbiter selects a VC that has traffic pending in the super-FIFO bypass, at which point the super-FIFO bypass may take priority, enabling the super-FIFO bypass to drain.

According to embodiments disclosed herein, a mask bit may be maintained for each VC as well as a mask bit per each input bus slot. The mask bit maintained for a VC may denote with or not the VC is eligible to send. The mask bit for the input bus slot may denote whether the input bus slot is transferring valid data. As such, determinations of whether or not a an input bus slot is transferring a valid message, invalid message, valid and eligible message, or valid but not eligible message may be determined.

Figure 4A:
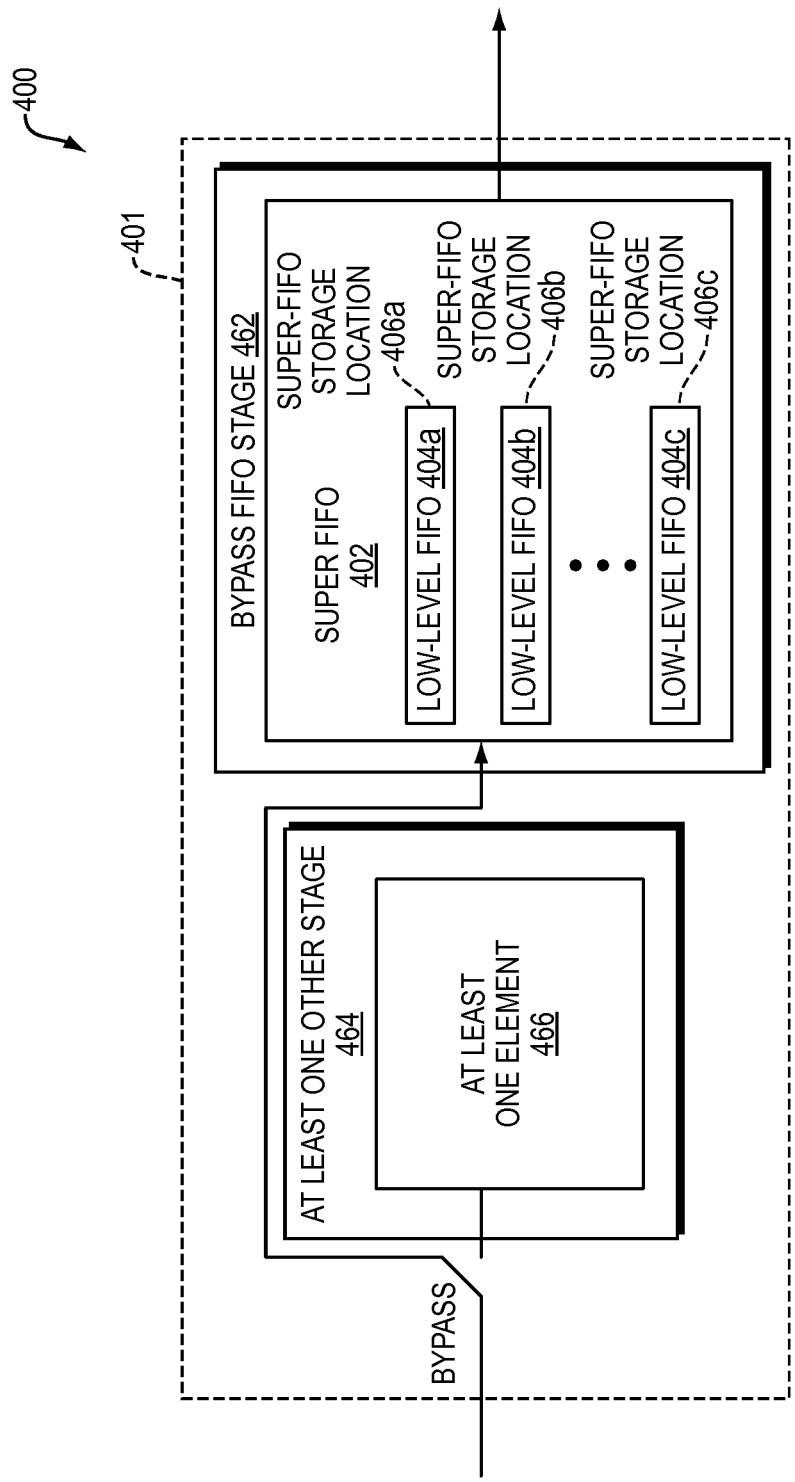
FIG. 4A is a block diagram of an embodiment of a system in which embodiments disclosed herein may be implemented.

FIG. 4A is a block diagram of an embodiment of a system 400 in which embodiments disclosed herein may be implemented. The system may include a bypass First-In First-Out (FIFO) stage 462. The bypass FIFO stage may include a super-FIFO 402 including a plurality of storage locations 406a-c. The bypass FIFO stage 462 may further include a plurality of low-level FIFOs 404a-c. Each low-level FIFO may be employed as a super-FIFO storage location of the plurality of super-FIFO storage locations to form the super-FIFO 402. The system may further include at least one other stage 464, the bypass FIFO stage 462 may enable bypass of at least one element 466 in the at least one other stage 464 to reduce latency in the system.

Figure 4B:
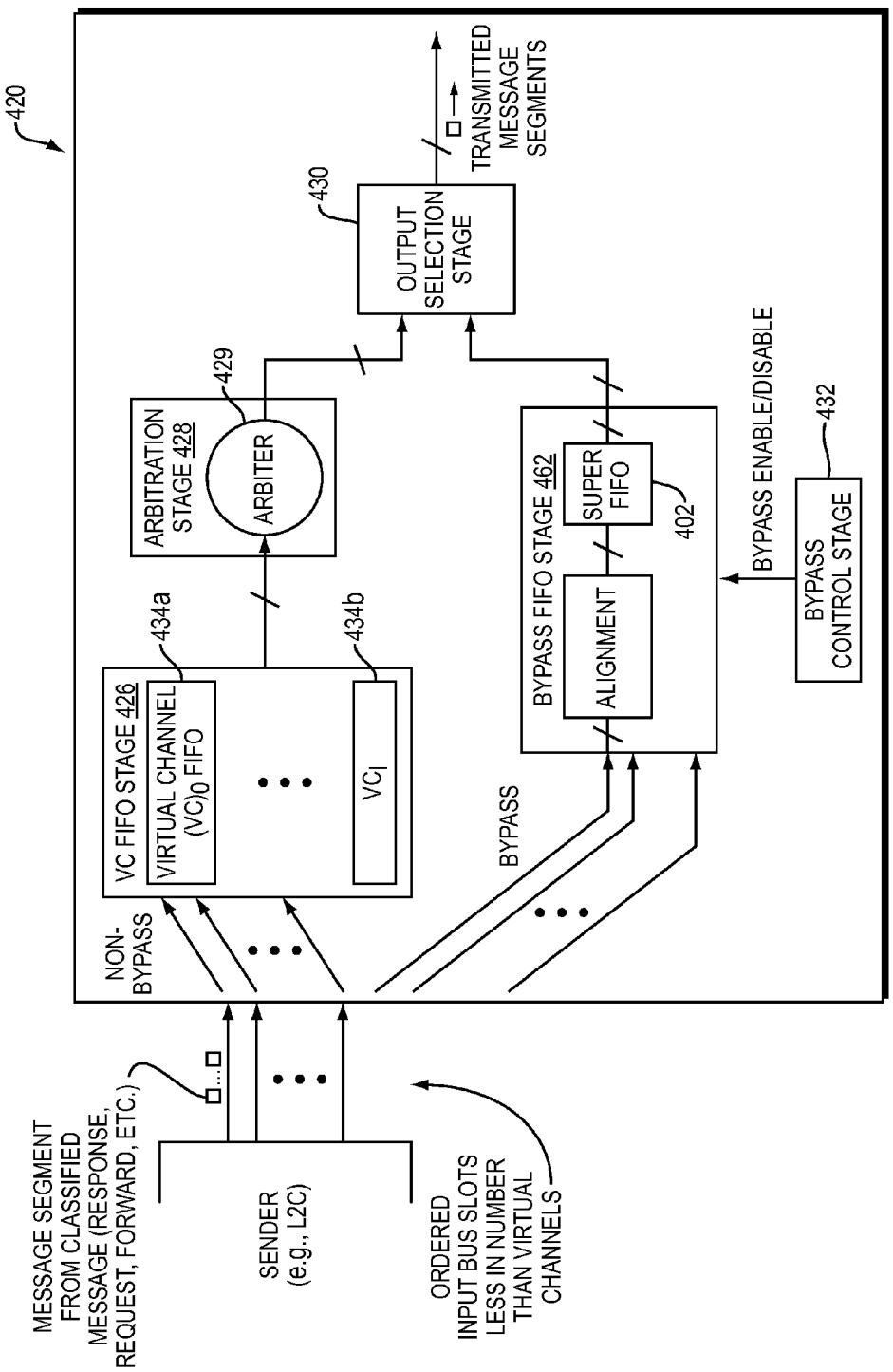
FIG. 4B is a block diagram of another embodiment of a system in which embodiments disclosed herein may be implemented.

FIG. 4B is a block diagram of another embodiment of a system 420 in which embodiments disclosed herein may be implemented. In the system 420, the bypass FIFO stage 462 may be coupled to a plurality of ordered input bus slots each associated with a valid-and-eligible, valid-but-not-eligible, or invalid message segment type, on a cycle-by-cycle basis. A message segment associated with a given ordered input bus slot of the plurality of ordered input bus slots may be aligned with the given low-level FIFO indicated as the starting push storage location, in a given cycle, based on an association of the given ordered input bus slot with the valid-and-eligible message segment type, in the given cycle, and a highest input bus slot order relative to other ordered input bus slots of the plurality of ordered input bus slots associated with the valid-and-eligible message segment type.

As there are a plurality of ordered input bus slots, a plurality of message segments may arrive in the given cycle. As such, an additional one or more message segments may be aligned as well, in the given cycle, if the additional one or more message segments are valid-and-eligible. Each additional segment that is valid-and-eligible may be aligned according to the order of the input bus slot transferring the additional segment. For example, the next valid-and-eligible message segment may be aligned with the next low-level FIFO. Determination of which additional message segment is the next valid-and-eligible message segment may be based on the input bus order. Determination of which low-level FIFO is the next low-level FIFO for pushing may be determined based on the push order. For example, an additional message segment may be aligned with a successive low-level FIFO, of the plurality of low-level FIFOs, according to the consecutive low-level FIFO push order determined. The additional message segment may be associated with a next ordered input bus slot that is associated with the valid-and eligible message segment type and a next highest input bus slot order relative to the other ordered input bus slots associated with the valid-and-eligible message segment type.

Each low-level FIFO of the plurality of low-level FIFOs may be associated with a tail pointer. Following the alignment determination, the message segment and each additional message segment may be pushed, simultaneously, to respective low-level FIFOs of the plurality of low-level FIFOs based on the alignment and tail pointers of the respective low-level FIFOs, in the given cycle.

The bypass FIFO stage 462 may be coupled to a plurality of input bus slots and may be configured to align valid-and-eligible message segments, associated with respective input bus slots of the plurality of input slots, with respective low-level FIFOs of the plurality of low-level FIFOs, in a given cycle, enabling pushing of the valid-and-eligible message segments, simultaneously, to the respective low-level FIFOs. The plurality of low-level FIFOs may be class agnostic (CA) FIFOs employed to queue message segments of messages irrespective of message class type.

The at least one other stage 466 may include a virtual channel (VC) FIFO stage 426 including a plurality of VC FIFOs 434a-b. Each VC FIFO of the plurality of VCs FIFOs 434a-b may be associated with a given VC and employed to queue message segments of messages associated with a message class type of the given VC. The at least one element may be at least one VC FIFO of the plurality of VC FIFOs.

The VC FIFO stage 426 may precede the bypass FIFO stage 462 and the at least one other stage 466 may further include an arbitration stage 428 including an arbiter 429 and may be interposed between the VC FIFO stage 426 and the bypass FIFO stage 462 in the system 420. The at least one element may include the arbiter 429. The arbitration stage may be prevented from sending traffic associated with the given VC in an event the super-FIFO has traffic queued for the given VC.

The system may further comprise an output selection stage 430 to select between the arbitration stage 428 and the bypass FIFO stage 462 or sending data in a given cycle. The output selection stage 430 may select between the arbitration stage 428 and the bypass FIFO stage 462 based on a round robin decision in an event both stages have data for sending in the given cycle. In an event both stages have data for sending in the given cycle, the output selection stage 430 may give priority to the arbitration stage 428 unless the arbitration stage 428 selects traffic for a particular VC for which the super-FIFO has queued traffic, in which case the output select stage 430 may give priority to the bypass FIFO stage, enabling the super-FIFO to drain.

A given VC may be eligible to use the bypass FIFO stage 462 in a given cycle provided a plurality of conditions are satisfied to prevent traffic reordering within the given VC and to prevent traffic blocking among different VCs.

The system may further comprise a bypass control stage 432 for the bypass FIFO stage 462, the bypass control stage may enable or disable bypass of the bypass FIFO stage 462, for example under software control such as a write to a specific register or register field of the bypass control stage 432.

The system 420 may be a multi-stream message system and entries queued in bypass FIFO stage 462 may be message segments from one or more message streams. As such the bypass FIFO stage 462 enables flexible and dynamic bypassing of messages irrespective of classification.

Since the super-FIFO may be employed as a bypass FIFO transferring ordered data elements that do not require arbitration, the system 420 may avoid the penalty of the arbitration stage. Further, because the number of input bus slots may dictate the number of low-level FIFOs, the super-FIFO may be implemented with less real-estate than a VC bypass FIFO type solution in which a VC bypass FIFO is employed for each VC. According to embodiments herein, the number of bus slots may be small, for example 6, whereas a number of VCs may be significantly higher.

FIG. 5 is a block diagram of an example of the internal structure of a computer 500 in which various embodiments of the present invention may be implemented. The computer 500 contains a system bus 502, where a bus is a set of hardware lines used for data transfer among the components of a computer or processing system. The system bus 502 is essentially a shared conduit that connects different elements of a computer system (e.g., processor, disk storage, memory, input/output ports, network ports, etc.) that enables the transfer of information between the elements. Operative with the system bus 502 is an I/O device interface 504 for connecting various input and output devices (e.g., keyboard, mouse, displays, printers, speakers, etc.) to the computer 500. A network interface 506 allows the computer 500 to connect to various other devices attached to a network. Memory 508 provides volatile storage for computer software instructions 510 and data 512 that may be used to implement embodiments of the present invention. Disk storage 514 provides non-volatile storage for computer software instructions 510 and data 512 that may be used to implement embodiments of the present invention. A central processor unit 518 is also operative with the system bus 502 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:
1. A circuit with a First-In/First-Out (FIFO) property, the circuit comprising:
a super-FIFO including a plurality of super-FIFO storage locations, the super-FIFO having a super-FIFO head pointer, a super-FIFO tail pointer, and a circular order; and
wherein a plurality of low-level FIFOs, each low-level FIFO having respective head and tail pointers separate from the super-FIFO head and tail pointers, are employed as the plurality of super-FIFO storage locations to form the super-FIFO, the super-FIFO enabling a push to each low-level FIFO, simultaneously, based on the super-FIFO tail pointer and the circular order, and the super-FIFO enabling a pop from each low-level

FIFO, simultaneously, based on the super-FIFO tail pointer and the circular order, to effectuate the FIFO property of the circuit.

2. The circuit of claim 1, wherein the super-FIFO is coupled to a plurality of input bus slots and a number of the plurality of low-level FIFOs equals a maximum number of data elements arriving, simultaneously, at the super-FIFO via the plurality of input bus slots.

3. The circuit of claim 2, wherein the maximum number of data elements arriving, simultaneously, at the super-FIFO is equal to a number of the plurality of input bus slots.

4. The circuit of claim 1, wherein:
each low-level FIFO includes a plurality of low-level FIFO storage locations and all of the low-level FIFO storage locations are logically arranged in an M-by-N matrix of M rows and N columns, wherein M and N are positive integers, each row of the M rows including all low-level FIFO storage locations of a given low-level FIFO of the plurality of low-level FIFOs, each column of the N columns including a given low-level FIFO storage location of each low-level FIFO, the given low-level FIFO storage location located at a same location within each low-level FIFO; and
the M-by-N matrix is filled or emptied on a column-by-column basis.

5. The circuit of claim 1, wherein:
a first low-level FIFO of the plurality of low-level FIFOs is first in the circular order, a last low-level FIFO of the plurality of low-level FIFOs is last in the circular order, and the circular order wraps from the last low-level FIFO back to the first low-level FIFO.

6. The circuit of claim 5, wherein the super-FIFO tail pointer indicates a next low-level FIFO that follows a last pushed low-level FIFO, consecutively, in the circular order, or the first low-level FIFO in an event none of the low-level FIFOs have been pushed.

7. The circuit of claim 5, wherein the super-FIFO head pointer indicates a next low-level FIFO that follows a last popped low-level FIFO, consecutively, in the circular order, or the first low-level FIFO in an event none of the low-level FIFOs have been popped.

8. The circuit of claim 1, wherein:
the super-FIFO is coupled to a plurality of input bus slots having an input slot order and data elements arriving via the input bus slots have the input slot order, the input bus slots transferring the data elements to the super-FIFO;
enabling the push to each low-level FIFO, simultaneously, according to the circular order, includes aligning the plurality of data elements having the input slot order with the plurality of low-level FIFOs, according to the circular order.

9. The circuit of claim 8, wherein the circular order is a circular order of the plurality of low-level FIFOs, the super-FIFO tail pointer indicates a given low-level FIFO of the circular order and aligning the plurality of data elements includes:
aligning the first data element of the input slot order to the given low-level FIFO of the circular order; and
aligning, consecutively, the next data elements of the input slot order with the next low-level FIFOs of the circular order.

10. The circuit of claim 1, wherein enabling the pop from each low-level FIFO, simultaneously, according to the circular order, includes aligning the plurality of low-level FIFOs, according to the circular order, with a plurality of output bus slots having an output slot order.

11. The circuit of claim 10, wherein the circular order is a circular order of the plurality of low-level FIFOs, the super-FIFO head pointer indicates a given low-level FIFO of the circular order and aligning the plurality of low-level FIFOs includes:
aligning the given low-level FIFO with the first output bus slot of the output slot order; and
aligning, consecutively, the next low-level FIFOs of the circular order with the next data output bus slots of the output slot order.

12. The circuit of claim 1, wherein each low-level FIFO of the plurality of low-level FIFOs is associated with a low-level FIFO tail pointer indicating a storage location within a corresponding low-level FIFO for a next push operation to the corresponding low-level FIFO.

13. The circuit of claim 1, wherein each low-level FIFO of the plurality of low-level FIFOs is associated with a low-level FIFO head pointer indicating a storage location within a corresponding low-level FIFO for a next pop operation of the corresponding low-level FIFO.

14. The circuit of claim 1, wherein enabling the push to each low-level FIFO, simultaneously, includes enabling pushing message segments from one or more message streams to the plurality of low-level FIFOs, simultaneously.

15. The circuit of claim 1, wherein the plurality of low-level FIFOs are class agnostic FIFOs employed to queue message segments irrespective of the associated message class type.

16. A system comprising:
a bypass First-In First-Out (FIFO) stage including:
a super-FIFO including a plurality of super-FIFO storage locations, the super-FIFO having a super-FIFO head pointer and a super-FIFO tail pointer,
wherein a plurality of low-level FIFOs, each low-level FIFO having respective head and tail pointers separate from the super-FIFO head and tail pointers, are employed as the plurality of super-FIFO storage locations to form the super-FIFO; and
at least one other stage, the bypass FIFO stage enabling bypass of at least one element in the at least one other stage to reduce latency in the system.

17. The system of claim 16, wherein the super-FIFO is coupled to a plurality of input bus slots and a number of the plurality of low-level FIFOs equals a maximum number of data elements arriving, simultaneously, at the super-FIFO via the plurality of input bus slots.

18. The system of claim 17, wherein the maximum number of data elements arriving, simultaneously, at the super-FIFO is equal to a number of the plurality of input bus slots.

19. The system of claim 16, wherein:
each low-level FIFO includes a plurality of low-level FIFO storage locations and all of the low-level FIFO storage locations are logically arranged in an M-by-N matrix of M rows and N columns, wherein M and N are positive integers, each row of the M rows including all low-level FIFO storage locations of a given low-level FIFO of the plurality of low-level FIFOs, each column of the N columns including a given low-level FIFO storage location of each low-level FIFO, the given low-level FIFO storage location located at a same location within each low-level FIFO; and
the M-by-N matrix is filled or emptied on a column-by-column basis.

20. The system of claim 16, wherein the super-FIFO enables a push operation to each low-level FIFO of the plurality of low-level FIFOs, simultaneously.

21. The system of claim 16, wherein the super-FIFO enables a pop operation from each low-level FIFO of the plurality of low-level FIFOs, simultaneously.

22. The system of claim 16, wherein each low-level FIFO of the plurality of low-level FIFOs is associated with a low-level FIFO tail pointer indicating a storage location within a corresponding low-level FIFO for a next push operation to the corresponding low-level FIFO.

23. The system of claim 16, wherein each low-level FIFO of the plurality of low-level FIFOs is associated with a low-level FIFO head pointer indicating a storage location within a corresponding low-level FIFO for a next pop operation of the corresponding low-level FIFO.

24. The system of claim 16, wherein the super-FIFO is associated with a super-FIFO tail pointer, the super-FIFO tail pointer indicating a given low-level FIFO of the plurality of low-level FIFOs as a starting push storage location and enabling a determination of a consecutive low-level FIFO push order for all other low-level FIFOs of the plurality of low-level FIFOs.

25. The system of claim 24, wherein:
the bypass FIFO stage is coupled to a plurality of ordered input bus slots each associated with a valid-and-eligible, valid-but-not-eligible, or invalid message segment type, on a cycle-by-cycle basis; and
a message segment associated with a given ordered input bus slot of the plurality of ordered input bus slots is aligned with the given low-level FIFO indicated as the starting push storage location, in a given cycle, based on an association of the given ordered input bus slot with the valid-and-eligible message segment type, in the given cycle, and a highest input bus slot order relative to other ordered input bus slots of the plurality of ordered input bus slots associated with the valid-and-eligible message segment type.

26. The system of claim 25, wherein an additional message segment is aligned with a successive low-level FIFO, of the plurality of low-level FIFOs, according to the successive low-level FIFO push order determined, each additional message segment associated with a next ordered input bus slot that is associated with the valid-and eligible message segment type and a next highest input bus slot order relative to the other ordered input bus slots associated with the valid-and-eligible message segment type.

27. The system of claim 26, wherein each low-level FIFO of the plurality of low-level FIFOs is associated with a tail pointer, and the message segment and each additional message segment are pushed, simultaneously, to respective low-level FIFOs of the plurality of low-level FIFOs based on the alignment and tail pointers of the respective low-level FIFOs, in the given cycle.

28. The system of claim 16, wherein the bypass FIFO stage is coupled to a plurality of input bus slots and is configured to align valid-and-eligible message segments, associated with respective input bus slots of the plurality of input slots, with respective low-level FIFOs of the plurality of low-level FIFOs, in a given cycle, enabling pushing of the valid-and-eligible message segments, simultaneously, to the respective low-level FIFOs.

29. The system of claim 16, wherein the bypass FIFO stage is coupled to a plurality of input bus slots and the super-FIFO is associated with a super-FIFO tail pointer indicating a given low-level FIFO of the plurality of low-level FIFOs for pushing a data element transferred via a given input bus slot of the plurality of input bus slots.

30. The system of claim 16, wherein the super-FIFO is associated with a super-FIFO head pointer indicating a given low-level FIFO of the plurality of low-level FIFOs to be used by a next super-FIFO pop operation.

31. The system of claim 16, wherein the plurality of low-level FIFOs are class agnostic FIFOs employed to queue message segments of messages irrespective of message class type.

32. The system of claim 16, wherein the at least one other stage includes a virtual channel (VC) FIFO stage including a plurality of VC FIFOs, each VC FIFO of the plurality of VC FIFOs associated with a given VC and employed to queue message segments of messages associated with a message class type of the given VC and the at least one element is at least one VC FIFO of the plurality of VC FIFOs.

33. The system of claim 32, wherein the VC FIFO stage precedes the bypass FIFO stage and the at least one other stage further includes an arbitration stage including an arbiter and interposed between the VC FIFO stage and the bypass FIFO stage in the system and the at least one element includes the arbiter.

34. The system of claim 33, wherein the arbitration stage is prevented from sending traffic associated with the given VC in an event the super-FIFO has traffic queued for the given VC.

35. The system of claim 33, wherein the system further comprises an output selection stage to select between the arbitration stage and the bypass FIFO stage for sending data in a given cycle.

36. The system of claim 35, wherein selecting between the arbitration stage and the bypass FIFO stage is based on a round robin decision in an event both stages have data for sending in the given cycle.

37. The system of claim 35, wherein, in an event both stages have data for sending in the given cycle, the output selection stage gives priority to the arbitration stage unless the arbitration stage selects traffic for a particular VC for which the super-FIFO has queued traffic, in which case the output select stage gives priority to the bypass FIFO stage, enabling the super-FIFO to drain.

38. The system of claim 33, wherein the given VC is eligible to use the bypass FIFO stage in a given cycle provided a plurality of conditions are satisfied to prevent traffic reordering within the given VC and to prevent traffic blocking among different VCs.

39. The system of claim 38 wherein the at least one other stage further includes an arbitration stage and the plurality of conditions includes:
a given VC FIFO, of the plurality of VC FIFOs, associated with the given VC is empty;
the given VC FIFO is not being pushed in the given cycle;
the arbitration stage is not holding a message segment popped from the given VC FIFO;
the given VC FIFO has at least one credit for sending;
a bypass control associated with the given VC is not disabled; and
the super-FIFO is not full.

40. The system of claim 16, further including a bypass control stage for the bypass FIFO stage, the bypass control employed to enable bypass of the bypass FIFO stage.

41. The system of claim 16, wherein the system is a multi-stream message system and entries queued in bypass FIFO stage are message segments from one or more message streams.

* * * * *